United States Patent [19]

Meulen

[11] Patent Number: 4,641,411

[45] Date of Patent: Feb. 10, 1987

[54] METHOD AND APPARATUS FOR THE MANUFACTURE OF A SCREEN ROLLER

[75] Inventor: Antonius M. Meulen, Helmond, Netherlands

[73] Assignee: Stork Screens B.V., Boxmeer, Netherlands

[21] Appl. No.: 726,488

[22] Filed: Apr. 24, 1985

[30] Foreign Application Priority Data

May 2, 1984 [NL] Netherlands ........................ 8401401

[51] Int. Cl.[4] ........................ B23P 12/00; B21B 31/08; B41F 13/10

[52] U.S. Cl. .................................. 29/424; 29/421 R; 29/130; 101/375

[58] Field of Search ............................ 101/375, 128.1; 29/421 R, 121.3, 130, 132, 424, 447

[56] References Cited

U.S. PATENT DOCUMENTS

| | | | |
|---|---|---|---|
| Re. 18,857 | 6/1933 | Lowe . | |
| 3,710,470 | 1/1973 | Krake | 29/131 |
| 3,814,054 | 6/1974 | Tajihi | 29/130 |
| 4,023,967 | 5/1977 | McGibbon | 29/130 |
| 4,089,265 | 5/1978 | White et al. | 101/375 |
| 4,098,631 | 7/1978 | Stryjewski | 29/130 |
| 4,144,813 | 3/1979 | Julian | 101/375 |
| 4,217,821 | 8/1980 | Vertegall et al. | 101/375 |
| 4,317,270 | 3/1982 | Watanabe et al. | 29/447 |
| 4,386,566 | 6/1983 | Moss | 101/375 |
| 4,461,663 | 7/1984 | Tachibana et al. | 101/375 |

FOREIGN PATENT DOCUMENTS

| | | |
|---|---|---|
| 0035810 | 9/1981 | European Pat. Off. . |
| 896083 | 5/1962 | United Kingdom . |

*Primary Examiner*—Howard N. Goldberg
*Assistant Examiner*—Steven Nichols
*Attorney, Agent, or Firm*—Burton, Parker & Schramm

[57] ABSTRACT

A method for manufacturing a loose screen-stencil-roller showing at its cylindrical outer surface a pattern of indentations, comprising the steps of starting with a smooth-walled support cylinder being either a hollow thick-walled roller or a massive roller, upon which a thin-walled sieve is pushed, after which the sieve is clampingly secured upon said cylinder: the invention also deals with an apparatus for applying this method comprising a support cylinder with fluid passages enabling the mounting and removal of the sieve around its outer periphery.

3 Claims, 3 Drawing Figures

METHOD AND APPARATUS FOR THE MANUFACTURE OF A SCREEN ROLLER

BACKGROUND OF THE INVENTION

The invention relates to a method for the manufacture of a roller which on its cylindrical outer surface is provided with a pattern of indentations (a so called screen roller). Normally a screen roller consists of a thick-walled or full metal cylinder in the surface of which a screen pattern has been applied by means of an appropriate technology for instance by applying a brayer after which this screen pattern is provided with a hard wear layer. These rollers must satisfy to very high precision requirements concerning geometry and finish, as well as centering and are therefore expensive. As a consequence of its use, wear in course of time will occur at the surface and damages will also appear, after which an expensive overhaul must be performed by the manufacture or in a specialized enterprise. The transport of the heavy and vulnerable rollers is expensive whilst the rollers to be reconditioned are not available for a long period. The keeping in stock of reserve rollers necessitates a great investment.

The invention aims at providing a method for the manufacture of a screen roller which does not possess these disadvantages. According to the invention this is obtained by starting from a hollow thick-walled or massive roller (a socalled support cylinder) around which a thin-walled cylindrical sieve is pushed, after which this sieve is clampingly mounted upon the support cylinder. By means of this method one obtains a screen roller composed of a smooth-walled support cylinder around which a thin sieve is secured. Such a screen roller can be applied for the even distribution of ink upon another roll, for instance in an off-set process.

A practical advantage of the invention can be obtained when the perforations of the sieve are first closed by applying a fluid impervious layer, whereby subsequently during the pushing up, a pressure fluid is supplied between the support cylinder and this sieve for the expansion of the sieve and the facilitating of the pushing up movement. Hereafter the supply of pressure fluid is ended. When the fluid impervious layer is applied against the inner side of the cylindrical sieve, then it is even possible to obtain an easily transformable screen roller. The pushing up as well as the removal of the sieve can in that case take place at any moment.

When the fluid impervious layer is applied to the outerside of the sieve, this layer must be removed after the mounting of the sieve in order to obtain the intended screen roller. The sieve can also be rendered temporarily impervious by filling up the holes (meshes). For the removal of the sieve it is then every time required that the sieve is once again rendered impervious. When the outer layer of the screen roller (which means the sieve) is worn out after the period of use of the screen roller, the old sieve can be cut open and consequently be removed from the support cylinder. Hereafter a new sieve adapted to the circumstances can be mounted upon this support cylinder without much lost of time.

A further aspect of the invention relates to an apparatus for performing the above described method, comprising a support cylinder embodied as a hollow thick-walled or a massive roller. According to the invention this apparatus is distinguished in that the support cylinder is provided on at least one of its front faces with at least one radial passage which opens at the outer periphery of this support cylinder, a connection being present for communication with a source of pressure fluid. This pressure fluid is mostly air, but may also be a liquid by means of which a thin-walled cylindrical sieve or screen stencil can be pushed upon the support cylinder or can be removed from it.

In an embodiment making use of a hollow thick-walled roller, this roller is at both ends provided with a support axle having a disc-shaped portion which is clampingly pushed in the concerning end of the roller, the radial passages consisting of a number of bores which at their innermost end empty into axial channels in the disc-shaped portion, a channel in the other disc-shaped portion being provided with the desired pressure fluid connection. Both disc-shaped portions render it possible that a cylindrical screen stencil having a removable impervious inner- or outer layer, can be pushed upon, or removed from the support cylinder by means of a layer of pressure fluid between said cylinder and the screen stencil.

It is however also possible to mount the sieve in a different manner clampingly around the smooth support cylinder. In that case one uses a sieve (screen stencil) within which latent crimping tensions are applied. After the pushing of the sieve upon the support cylinder—which sieve in this case should have a somewhat greater diameter than said cylinder—the sieve is being subjected to a thermal treatment in order to free the latent crimp tension in order to crimp the sieve upon the support cylinder.

SURVEY OF THE DRAWINGS

FIG. 1 gives in longitudinal section a first apparatus for the execution of the method according to the invention.

DESCRIPTION OF THE PREFERRED EMBODIMENTS

Figure 1:
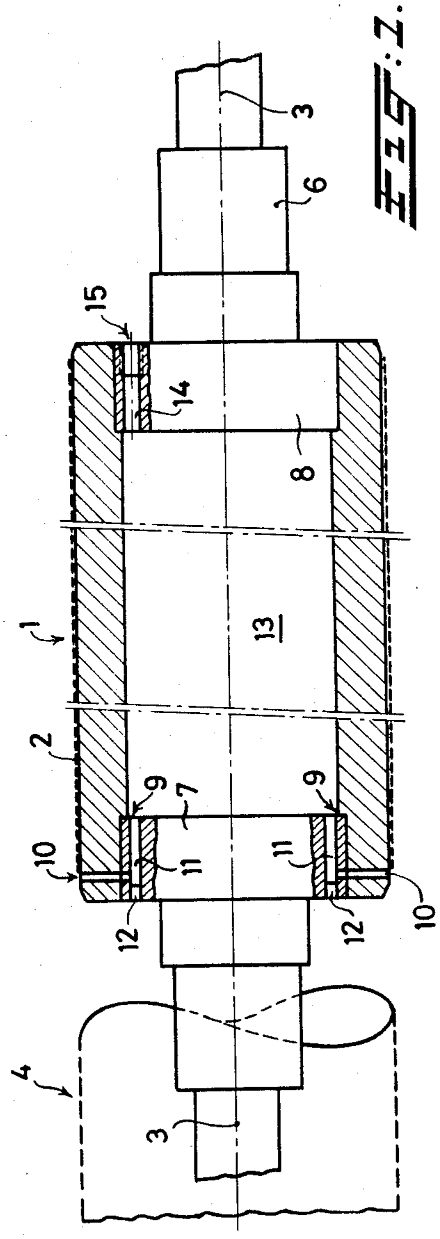

As is visible in FIG. 1 a support cylinder 1 is present in the form of a hollow thick-walled roller for the execution of the method and for the application of the apparatus. This roller 1 has been chromium-plated at its outer side or is covered by a non-perforated thin chromium sleeve 2 which is represented in dash lines. Hereafter this roller can be positioned upright such that its axis 3 is standing vertical as represented in the apparatus according to FIG. 3. Upon this support cylinder or mother roller 1, a stencil or sieve 4 must be pushed such that this sieve is finally clampingly secured upon the support cylinder 1. The sieve 4 is standing in line with the support roller 1. In the embodiments according to FIGS. 1–3 this mounting is performed by means of a pressure fluid, mostly air.

To this end the perforations of the cylindrical sieve 4 are first closed, for instance by applying a removable, fluid-impervious layer. Both ends of the cylinder 1 are provided by a support axle 5, 6 clampingly pushed with a disc-shaped portion 7, 8 in the concerning end of the cylinder. These portions 7 and 8 can abut against a shoulder 9 upon the innerside of the cylinder. One of the ends of the support cylinder 1 is provided with a number of radial openings 10. These open at the outer periphery of the cylinder and are in communication with an axially directed channel 11 in the disc-shaped portion 7. Each of these channels 11 has a blind extremity or a closure cap 12 at the concerning front face of the cylinder. The other (open) end of these channels 11 are in communication with the internal space 13 of the support cylinder 1. The disc-shaped portion 8 at the other end of the cylinder has at least one axially directed channel 14 that on one side is in communication with the space 13 and at the other end with a connecting nipple 15. This nipple 15 can be connected through a non-shown hose with a source (not shown either) of pressure fluid, mostly compressed air.

The sieve 4 to be mounted upon the support cylinder 1 has such a diameter that it fits clampingly upon the support cylinder. In order to mount the sieve 4 yet upon the cylinder 1, the outer portion of the cylinder beyond the openings 10 is slightly conically beveled. The sieve 4 is pushed upon the beveled portion for overlapping the openings 10. Subsequently a pressure fluid is supplied into the space 13 through the connection 15 and the channel 14 such that the (closed) sieve 4 will be somewhat expanded enabling the sieve to be pushed further over the support cylinder 1. The pressure fluid has the double task of somewhat expanding the sieve 4 and simultaneously act as a lubricant during the shifting of this sieve over the support cylinder.

After the completion of this moving up action, the communication with the source of pressure fluid can be interrupted whereafter this fluid leaks away such that the sieve 4 is clampingly mounted upon the support cylinder 1. Hereafter the impervious outer layer of the sieve can be removed (for instance by washing) after which the screen roller is ready for use.

The removal of the sieve or stencil 4 can be performed in different manners. In case no renewed use is intended, the stencil can be cut open. One will perform this with a worn out or damaged stencil. When, however, one aims at interchanging a still usable sieve, then one should previously take care that the fluid impervious layer has been applied to the innerside of the stencil. The sieve can also be rendered impervious by filling the holes for instance by means of a squeegee or doctor. Only then the removal can take place by means of an application known per se of pressure fluid in the narrow space between the support cylinder and the sieve.

Figure 2:
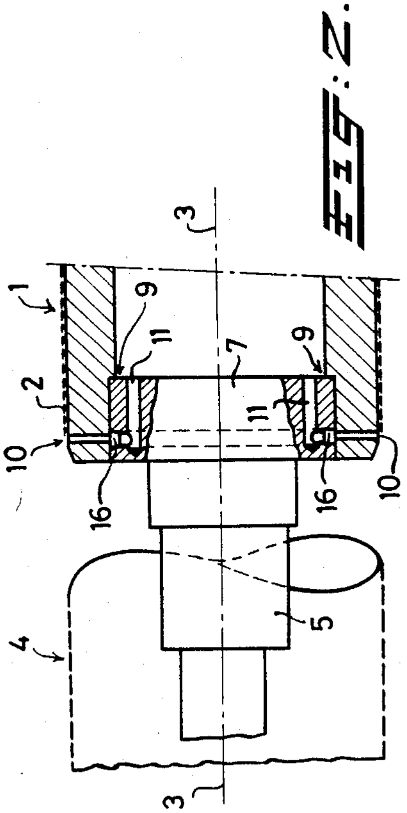
FIG. 2 is a variant upon the left portion of the apparatus according to FIG. 1.

In the variant according to FIG. 2, the disc-shaped portion 7 is provided along its outer periphery with a circular groove 16. By these means, the connection between the or each channel 11 and the openings 10 is simplified.

Figure 3:
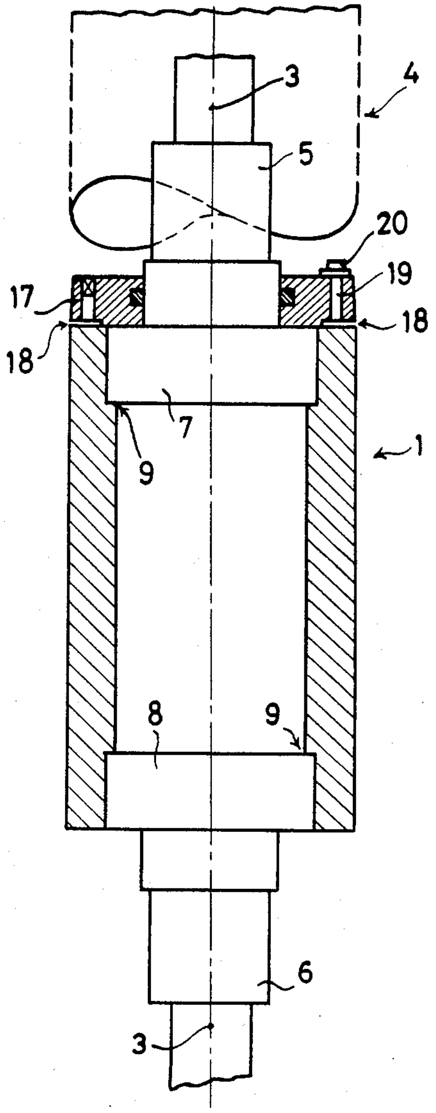
FIG. 3 shows equally a longitudinal section on smaller scale of a different apparatus.

The apparatus according to FIG. 3 distinguishes through a mounting ring 17 lying against the disc-shaped portion 7 of the support axle 5. The ring bounds with the front face of the cylinder 1 a small annular interval or slit 18 equivalent to the radial passage 10 from the FIGS. 1 and 2. The mounting ring 17 is provided with at least one axial channel 19 provided with a connection 20 for a source of pressure fluid. The outer periphery of the ring 17 is conical so that the mounting of the screen stencil 4 can take place in the same manner as described with reference to FIG. 1.

As already indicated in the preceding part, in stead of the described hydraulic or pneumatic mounting manner one can also use a screen stencil which is internally provided with latent crimp tensions. This stencil can be freely pushed with some clearance upon the support cylinder and will be secured by crimping upon this cylinder through a thermal treatment.

In elucidation of the method it can be observed that by applying a screen fineness of 10–500 lines/cm in the sieve 4, a screen roller for each desired type can be obtained. The thickness of the sieve or screen stencil 4 can lie between 65–80 μm and the permeability percentage of the perforations can amount to 20–30%. The impervious inner- or outer layer which is removable and can be temporarily applied upon the sieve 4, can be prepared from a PVA-coating. The pressure fluid to be applied (mostly air) can have an over-pressure of about 4 ato with a maximum pressure of +6 ato.

What is claimed is:

1. A method of making a screen roller having a support cylinder encircled by a tightly fitting sieve-like screen comprising the steps of:

- providing a cylindrical sieve-like screen having an internal diameter slightly less than the outside diameter of the support cylinder;
- coating the screen to render it substantially fluid impervious;
- applying fluid pressure between the screen and the support cylinder to expand the screen to fit over the support cylinder and while maintaining it expanded sliding the screen and support cylinder axially together;
- removing the fluid pressure to allow the screen to contract into tightly fitting engagement around the support cylinder; and
- treating the screen to remove the fluid impervious coating from its outer surface.

2. The method of claim 1 wherein the fluid impervious coating is applied only to the inside diameter surface of the screen leaving the outside surface uncoated.

3. The invention defined by claims 1, or 2 wherein the coating comprises a PVA-substance.

* * * * *